United States Patent [19]

Sublett

[11] 4,419,507

[45] Dec. 6, 1983

[54] COPOLYESTER ADHESIVES

[75] Inventor: Bobby J. Sublett, Kingsport, Tenn.

[73] Assignee: Eastman Kodak Company, Rochester, N.Y.

[21] Appl. No.: 437,060

[22] Filed: Oct. 27, 1982

Related U.S. Application Data

[63] Continuation-in-part of Ser. No. 342,612, Jan. 25, 1982.

[51] Int. Cl.$^3$ .................... C08G 63/16; B32B 27/00
[52] U.S. Cl. .................................. 528/302; 428/290; 528/308.6; 528/308.7
[58] Field of Search ............... 528/302, 308.6, 308.7; 428/290

[56] References Cited

U.S. PATENT DOCUMENTS

| | | | |
|---|---|---|---|
| 3,669,921 | 6/1972 | Droke et al. | 260/40 R |
| 4,094,721 | 6/1978 | Sturm et al. | 528/308.7 X |
| 4,156,774 | 5/1979 | Buxbaum et al. | 528/302 X |
| 4,166,895 | 9/1979 | Buxbaum | 528/272 |
| 4,335,188 | 6/1982 | Igi et al. | 528/302 X |

FOREIGN PATENT DOCUMENTS 2001906 2/1979 United Kingdom .

OTHER PUBLICATIONS

Chem. Abst. vol. 80 (1974) 121751f.
French Translation 2,212,410.

Primary Examiner—Lucille M. Phynes
Attorney, Agent, or Firm—John F. Stevens; Daniel B. Reece, III

[57] ABSTRACT

Disclosed are linear, crystalline or partially crystalline copolyesters derived from 100 mole % of a dibasic acid component comprising at least 40 mole % terephthalic acid and up to about 60 mole % of a second dicarboxylic containing 3–12 carbon atoms, and 100 mole % of a glycol component comprising at least 40 mole % 1,4-butanediol and up to about 60 mole % diethylene glycol, the copolyester characterized by having a melting point of about 40°–220° C., a glass transition temperature of about −20° C. to about 40° C., a heat of fusion of not less than 1.0 calorie per gram, and a crystalline half time of less than 10 minutes at maximum crystallization temperature. These copolyesters are especially useful as fusible interlining adhesives and binder fibers.

15 Claims, No Drawings

COPOLYESTER ADHESIVES

DESCRIPTION

BACKGROUND OF THE INVENTION

This application is a continuation-in-part of U.S. application Ser. No. 342,612 filed Jan. 25, 1982.

FIELD OF THE INVENTION

This invention relates to certain copolyesters which have been found to be useful as adhesives, especially fabric interlining adhesives and binder fibers.

BACKGROUND OF THE INVENTION

Fabric interlining adhesives are used on fusible interlinings, which are materials such as fabric which have been coated on one side with a discontinuous pattern of adhesive. When the interlining is bonded to a face fabric in a garment, it provides body and shape to the garment without impairing the ability of the fabric to breathe. Fusible interlinings are used in the manufacture of suits, in shirt collars and cuffs, and in the waistbands of trousers. In the manufacture of suits, polycarbonate basting threads are frequently used to temporarily hold the parts of the suit in place. After the suit is completed, a solvent such as perchloroethylene or trichloroethylene is used to embrittle the polycarbonate thread so that it may be brushed from the fabric.

Binder fibers are used with nonwovens, which are formed from matrix fibers into a web, sheet, or mat. The binder fibers give strength to the web, mat, or sheet by bonding it together. The most common binder elements in use today are the water-based latexes. These latexes have poor adhesion to synthetic and natural fibers and require as much as 50% by weight add-on of cured latex to impart useful strength to the nonwovens. Also, most of the latexes contain melamine crosslinking components which undesirably emit formaldehyde when cured. Other bonding media used, although in much smaller quantities, are binder fibers. The binder fibers now used are polyolefin, polypropylene, poly ethylene, and copolymers of the two, or partially oriented poly(ethylene terephthalate) or copolyesters of poly(ethylene terephthalate). The polyolefin binder fibers have poor adhesion to nonwoven matrix fibers which are not polyolefin and require very high add-on even when used to bond polyolefin fibers. The polyester and copolyesters used are partially oriented fibers which require relatively high bonding temperatures and have very narrow temperature ranges for bonding, because of their tendency to crystallize as the bonding temperature reaches the glass transition temperature of the binder fiber. These fibers cannot be melted or rendered molten because they have approximately the same melting temperature or flow temperature as the high melting polyester matrix fiber and a much higher melting temperature than the polyolefin matrix fiber. To use these high temperatures would cause the matrix fiber to form a film sheet with no esthetic resemblance to a fabric. Partially oriented binder fibers must be bonded quickly within a very narrow temperature range as the temperature of the fiber reaches the softening point of the partially oriented fiber and before the fiber crystallizes. Once the fiber crystallizes, it must be heated above its crystalline melting point before it can be bonded and this temperature is usually high enough to destroy the fiber integrity of the matrix fiber.

I have now discovered a family of copolyesters which are useful as fusible interining adhesives and binder fibers. These copolyesters can be spun into fibers that are exceptionally useful for blending with matrix fibers, and which can be bonded over a wide range of temperatures to impart strength and esthetic properties. These copolyester adhesives have excellent adhesion to polyolefin, polyester, polyamide, and cellulosic fibers such as paper. Fibers of these copolyesters can be blended with matrix fibers by either wet lay, dry lay, or air lay processing. They are bondable over a wide range of temperatures and pressures to form fabrics or sheets which are smooth like film or high loft battings. The copolyesters give bond strength equivalent to other known binder fibers at much lower loading weights.

Certain polyesters are known to be useful for fusible interlining adhesives and binder fibers. However, these polymers also tend to have certain disadvantages. For example, one polyester of interest is the copolyester of terephthalic acid, adipic acid, ethylene glycol and 1,4-butanediol as described in U.S. Pat. No. 3,699,921. Such polyesters tend to block in pellet form and fumed silica must be added in significant amounts to make it possible to grind this polymer into powder. Excessive amounts of fumed silica in the powder, however, prevent good coatability and good fusion of the powders on the fusible interlining fabric when applied with powder point applicators.

Copolyesters generally have lower melting points than homopolyesters. For example, the melting point of a polyester of terephthalic acid and ethylene glycol is around 260° C. A polyester consisting of 90 mole % of terephthalic acid and 10 mole % of isophthalic acid in which ethylene glycol has been used as the diol component, has a melting point of 236° C. When the molar ratio of terephthalic acid to isophthalic acid is 80:20, a copolyester is obtained which has a melting point of 210° C. When the ratio of terephthalic acid to isophthalic acid is 70:30 the melting point drops to 185° C. Conditions are similar when ethylene glycol is replaced by 1,4-butanediol. A polybutylene terephthalate comparable to polyethylene terephthalate has a melting point of 225° C.

In German Offenlegungsschrift No. 1,920,432 there is disclosed a dry-cleaning, fluid resistant polyester fusion adhesive prepared from (1) terephthalic acid and ethylene glycol, (2) adipic acid and 1,4-butanediol. The degree of crystallization of this copolyester, however, is already so low that it is not suitable for a fusion adhesive. Disadvantages reside in both the surface stickiness of the coated substrate and the stickiness of the copolyesters which is considerable even at room temperature. Copolyesters of this type are not suitable for the preparation of adhesives in powder form.

U.S. Pat. No. 4,252,940 discloses copolyester adhesives of terephthalic acid together with isophthalic, succinic, adipic or glutaric, and a blend of 1,6-hexanediol and diethylene glycol.

Other copolyester fabric adhesives are disclosed in my U.S. Pat. No. 4,330,670. This patent discloses copolyesters derived from 1,4-cyclohexanedicarboxylic acid and 1,4-butanediol and optional second acids or glycols.

It is well known in the art that the crystallinity of a polyester is one parameter which may be used to determine solvent resistance, i.e., the more amorphous (less crystalline), the more susceptible to dry-cleaning solvents the polyester will be. Also, glass transition temperature is a parameter by which the temperature at which a polyester, even an amorphous polyester, will be affected by a solvent.

It is also known that modification of a homopolyester by copolymerization with other acid or glycol moieties r combanations of glicol and acid moieties to form copolymers or terpolymers drastically reduces or eliminates crystallinity. The crystallinity of copolyesters is also dependent on the particular comonomers from which the copolyester is synthesized. For example, a polyester of terephthalic acid and 1,4-butanediol (even number of carbon atoms) will crystallize more readily than a polyester prepared from terephthalic acid and either 1,3-propanediol (odd number carbon atoms) or 1,5-pentanediol (odd number of carbon atoms). The crystallization phenomenon of copolyesters, expecially those that are low melting, below 150° C., is unpredictable.

Amorphous polyesters cannot be used as fusion adhesives in which resistance to dry-cleaning agents and high set-up speed are required. In like manner, those polyesters are undesirable which have too little crystallinity, because they solidify too slowly and consequently do not lose their surface stickiness for long periods of time.

Other copolyesters of interest are those disclosed in U.S. Pat. Nos. 4,094,721; 3,948,859; 4,012,363; and 3,853,665.

DISCLOSURE OF INVENTION

The copolyesters according to the present invention provide adhesives useful on fusible interlinings and as binder fibers. These copolyester adhesives are an improvement over prior art adhesives in that they provide a unique combination of desirable properties for interlining adhesives and binder fibers such as good adhesion to a variety of materials, desirable melt and fusion temperatures, resistance to dry cleaning fluids, desirable crystallinity and crystallization rates, spinnability, grindability, etc.

According to the present invention. there are provided linear, saturated, crystalline or partially crystalline copolyesters especially useful as fusion adhesives in securing textile substrates together, and which are resistant to dry-cleaning solvents. These copolyesters have low melting temperatures and rapid crystallization rates, and are derived from (1) an acid component of terephthalic acid and optionally a second dicarboxylic acid containing 3-12 carbon atoms, and (2) a glycol component of 1,4-butanediol and optionally diethylene glycol.

The acid component contains about 40-100 mole % terephthalic acid. The acid component also comprises about 60-0 mole % of a second dicarboxylic acid having 3-12 carbon atoms.

The glycol component contains about 40-100 mole % 1,4-butanediol. The glycol component also comprises up to about 60-0 mole % diethylene glycol.

The physical characteristics of the copolyesters according to this invention require that either the acid or glycol component, or both, be a mixture of at least two acids or two glycols. That is, either the acid component must contain a second acid as described above in addition to terephthalic acid, or the glycol component must contain diethylene glycol in addition to 1,4-butanediol. Both the acid and glycol components may be modified to obtain physical characteristics as described herein if desired. Out of the total 200 mole % acid and glycol in the copolyester, about 20-120 mole % is derived from about (a) 0-60 mole % of a second aliphatic dicarboxylic acid (i.e., in addition to terephthalic) having 3-12 carbon atoms,
(b) 0-60 mole % of diethylene glycol, or
(c) 20-120 mole % of a combination of (a) and (b).

As a general rule, each mole % of modification of polybutylene terephthalate lowers the melting point of the polyester about 1°-2° C., usually about 1.5° C.

Each of the acids and glycols identified above are commercially available, or they may be prepared by well-known procedures.

The copolyesters are characterized as having crystalline melting points of 40° to 190° C. The copolyesters show a degree of crystallinity measured as the apparent heat of fusion ($\Delta H_f$) to be greater than 1.0 cal/gram, preferably 3.0 cal/gram or greater. The copolyesters have a glass transition temperature, $T_g$, of $-20°$ to $+40°$ C. Also, the crystallization half times of the copolyesters should be less than 10 minutes at their maximum crystallization temperature, preferably less than five minutes.

For fusible interlining adhesives, it is preferred that copolyesters in accordance with this invention be derived from 50-100 mole % terephthalic acid, and 50-100 mole % 1,4-butanediol, wherein about 60-120 mole % based on a total of 200 mole % in the copolyester is derived from about (a) 0-60 mole % of a second acid selected from adipic, glutaric, or succinic,
(b) 0-60 mole % of diethylene glycol, or
(c) 60-120 mole % of a combination of the second acid and diethylene glycol, and that the copolyesters have a melting point of 40°-130° C., Tg of $-20°$ C. to $+40°$ C., $\Delta H_f$ of greater than 1.0 and a crystallization half time at maximum crystallization temperature of less than 10 minutes.

For binder fibers, it is preferred that copolyesters in accordance with this invention be derived from about 40-100 mole % terephthalic acid, and about 40-100 mole % 1,4-butanediol, wherein about 20-70 mole % based on a total of 200 mole % in the copolyester is derived from about (a) 0-60 mole % of a second acid selected from dicarboxylic acids having 3-12 carbon atoms,
(b) 0-60 mole % of diethylene glycol, or
(c) 20-70 mole % of a combination of the second acid and diethylene glycol, and that the copolyesters have a melting point of 125°-190° C., Tg of $-20°$ C. to $+40°$ C., $\Delta H_f$ of greater than 1.0 and a crystallization half time at maximum crystallization temperature of less than 10 minutes. The copolyesters of the present invention may be prepared by well-known condensation polymerization techniques.

The crystalline melting point, $\Delta H_f$, and $T_g$ referred to above are measured by conventional means using a Differential Scanning Calorimeter.

Ester forming derivatives of the acids referred to herein can be employed, if desired, to prepare the copolyesters of this invention. Examples of such ester forming derivatives are the anhydrides, esters and ester chlorides of such acids.

These copolyesters are readily put into powder form using conventional grinding techniques, preferably by cryogenic grinding. The powders are nonblocking and can be readily applied to fusible interlining fabrics from powder point applicators, from random sprinkling equipment, or in the form of a paste. The particles are finely divided, i.e., from about 1 micron to about 500 microns. In the application of powders from powder point applicators, it is desirable to have powders with a particle size range of 50–200 microns (200–70 mesh). For random sprinkling application on tightly woven or nonwoven fabrics, particle size of 150–300 microns (100–50 mesh) is desirable. For random sprinkling on open-weave fabrics such as rayon/cotton blends, powders with 300–500 micron size (50–35 mesh) are required. For application of powder in paste form, it is necessary to have very fine powders. For example, in paste form, powder size should be 1–80 micron (less than 200 U.S. mesh). In the case of binder fibers, such fibers can be produced using conventional spinning techniques well known in the art. The copolyesters may also be used in other forms, such as a film.

The "heat of fusion", $\Delta H_f$, of polymers is the amount of heat absorbed when crystallizable polymers are melted. $\Delta H_f$ values are readily obtained using Differential Scanning Calorimeters (DSC) (Perkins-Elmer). For example, one method for determining $\Delta H_f$ is described in *Journal of Applied Polymer Science*, 20 1209 (1976). Measurement of $\Delta H_f$ is also described in DuPont Thermal Analysis Bulletin No. 900-8 (1965). Qualitatively, it is possible to compare the degree of crystallinity of polymers by comparing their $\Delta H_f$ values.

One of the commonly used parameters for describing the crystallization rate of a polymer is the crystallization half-time, $t_{1/2}$. The crystallization half-time is simply the time at which the crystallization of the originally amorphous sample is half completed according to the method used to monitor crystallinity and may be determined in conventional manners. The half-time is strongly dependent on the crystallization temperature. Reference is made to "Kinetics of Phase Change.II-Transformation-Time Relations for Random Distribution of Nuclei" by Melvin Avrami, published in "Journal of Chemical Physics", Feb. 1940, page 212.

One way of determining the isothermal crystallization of a polymer is an approximation described by the Avrami equation $$X = X_o \left(1 - e^{-(\frac{t}{\tau})^n}\right) \qquad (1)$$

where $X_o$ is the limiting value of the crystallinity, X is isothermal crystallization, $\tau$ is a characteristic time determined by the polymer and the crystallization temperature, and n is the so-called Avrami exponent, generally in the range 2.0 to 3.5. The reduced crystallization half-time, $(t/\tau)_{1/2}$, is obtained by solving $$\frac{X}{X_o} = \tfrac{1}{2} = 1 - e^{-(\frac{t}{\tau})^n}_{\tfrac{1}{2}} \qquad (2)$$

to get $$(\tfrac{t}{\tau})_{\tfrac{1}{2}} = \sqrt[n]{\ln 2} \qquad (3)$$

The DSC response obtained would be described by differentiating equation (1) with respect to time to get $$\frac{dX}{dt} = X_o \frac{n}{\tau} \left(\frac{t}{\tau}\right)^{n-1} e^{-(\frac{t}{\tau})^n} \qquad (4)$$

This function has a maximum for all $n > 1$. Differentiating equation 4 with respect to time, setting the derivative equal to zero and solving to $t/\tau$, one finds the maximum of dX/dt, which is the peak of the DSC curve, to be located at $$\frac{t_p}{(\tau)} = \sqrt[n]{\frac{n-1}{n}} \qquad (5)$$

where $t_p$ is the time required to reach the peak of crystallization exotherm. The ratio of $t_p/(\tau)$ to $(t/\tau)_{1/2}$, $$\frac{(t_p)}{\tau} \bigg/ \left(\frac{t}{\tau}\right)_{\tfrac{1}{2}} = \frac{t_p}{t_{\tfrac{1}{2}}} = \sqrt[n]{\frac{n-1}{n \ln 2}} \qquad (6)$$

The ratio $t_p/t_{1/2}$ is between 0.85 and 1.04 for $n \geq 2$. The curve of $t_p$ vs. crystallization temperature is a sufficient approximation of the curve $t_{1/2}$ vs. crystallization temperature.

When copolyesters prepared as described above are employed as melt adhesives to laminate various fabric systems, metal strips and the like, excellent bonds result. These bonds are found to be highly resistant to the action of dry cleaning solvents such as perchloroethylene. The strength of the bonds is determined by a peel test based on the ASTM "T-Peel Test" set forth on pages 609–611 of the 1972 edition of the BOOK OF ASTM STANDARDS, published by the American Society for Testing Materials, and more specifically identified as Test Number D-1876-69. Results are averages of three specimens.

If desired, dyes or dye receptive agents, color stabilizers and various other adjuvants may be added to the copolyester adhesives to meet certain specific end use requirements. Such additives would normally be added as such to the polymerization mixture in which the copolyester is produced.

As used herein, the inherent viscosity (I.V.) is measured at 25° C. using 0.50 gram of copolyester per 100 ml. of a solvent consisting of 60 percent by weight phenol and 40 percent by weight tetrachloroethane.

The following examples are submitted for a better understanding of the invention.

EXAMPLES

A typical copolyester prepared in accordance with this invention is as follows: Fifty-three and thirty-five hundredths grams of dimethyl terephthalate (0.275 mole), 36 grams (0.225 mole) of dimethyl glutarate, 55.35 grams (0.615 mole) of 1,4-butanediol, 40.8 grams (0.385 mole) of diethylene glycol, and 1 mL of n-butanol solution of titanium tetraisopropoxide which is 1.24 wt % titanium are weighed into 500-mL single-neck round-bottom flask equipped with a nitrogen inlet, stirrer, vacuum outlet, and a condensing flask. The flask is heated at 200° C. in a Belmont metal bath for three hours with a nitrogen sweep over the reaction mixture. When the theoretical amount of methanol has distilled from the reaction mixture, the metal bath temperature is increased to 255° C. at a reduced pressure of 0.5 to 0.1 mm of mercury for one hour. The flask is then removed from the bath and allowed to cool as the polyester crystallizes. Gas chromatographic analysis of the copolyester reveals the copolyester contains the following mole percents of reaction residues: dimethyl terephthalate, 55 mole %; dimethyl glutarate, 45 mole %; 1,4-butanediol, 70 mole %; and diethylene glycol, 30 mole %.

The copolyester has an inherent viscosity of 1.0 and a crystalline melting point of 115° C. (DSC). The crystallization half time of this copolyester is 1.2 minutes at 60° C. The copolyester is an excellent fabric adhesive.

The polyester adhesives, prepared as described in the general example above, are cryogenically ground and screened to obtain a powder that will pass a 70-mesh screen. The powders are applied from an engraved roll to a cotton interlining fabric to form an interlining containing rows of adhesive dots across the interlining fabric. The interlining is used to bond two different face fabrics, wool/polyester and polyester/cotton. The interlinings are bonded to face fabrics by pressing four-inch squares of interlining to four-inch squares of face fabric using either steam or an electric press. The bonded fabrics are laundered and dry cleaned, then cut into strips one-inch wide and T-peel strength determined before and after dry cleaning. The T-peel strengths reported are an average of three determinations per sample.

Examples of copolyesters that are useful as low-melting, partially crystalline adhesives which are resistant to dry cleaning and have good adhesion to a variety of fabrics and have rapid crystallization rates are shown in Table 1 in Examples 1 through 8. The examples show that copolyesters based on dimethyl terephthalate and a second acid moiety with the major glycol being 1,4-butanediol and containing minor portions of diethylene glycol, are grindable into powder, have rapid crystallization rates, and have sufficient, crystallinity, insolubility in dry-cleaning solvents, and low temperature bonding characteristics making them useful as fabric adhesives.

Example 9 is an example of a copolyester based on dimethyl terephthalate, 1,4-butanediol, and diethylene glycol in which the second acid moiety is isophthalic acid. This copolyester has a very slow crystallization rate, a low degree of crystallinity, and is, therefore, tacky and has poor resistance to dry cleaning. Example 10 is a copolyester based on dimethyl terephthalate, dimethyl glutarate, 1,4-butanediol, where ethylene glycol has been substituted for diethylene glycol. The copolyester has a very slow crystallization rate, is tacky, and does not have adequate resistance to dry cleaning. Example 11 is a copolyester based on 1,4-cyclohexanedicarboxylate, 1,4-butanediol, and diethylene glycol. This copolyester is low melting (91° C.) and has a low degree of crystallinity ($\Delta H_f$ cal./g <1). The copolyester is tacky and will bond fabrics, but has poor grindability and poor dry-cleaning resistance. Example 12 is a copolyester based on dimethyl terephthalate, isophthalic acid, azelaic acid, and a single glycol, 1,4-butanediol. The copolyester is low melting (115° C.), but has a slow crystallization rate, is tacky, and does not have adequate dry cleanability.

TABLE 1
Properties of Copolyester Adhesives

| Example No. | 1 | 2 | 3 |
|---|---|---|---|
| Molar Percentages of Acid and Glycol Components | 65 Dimethyl Terephthalate 35 Dimethyl Glutarate 70 1,4-Butanediol 30 Diethylene Glycol | 60 Dimethyl Terephthalate 40 Dimethyl Glutarate 75 1,4-Butanediol 25 Diethylene Glycol | 70 Dimethyl Terephthalate 30 Dimethyl Glutarate 55 1,4-Butanediol 45 Diethylene Glycol |
| Inherent viscosity | 1.0 | 1.0 | 0.91 |
| $\Delta H_f$ Cal./g (DSC) | 2.74 | 3.65 | 2.86 |
| T-Peel Strength 23° C. lb./in. | 2.7 | 2.2 | 2.1 |
| T-Peel Strength After Dry-Cleaning (Commercial) lb./in. | 2.5 | 2.1 | 2.0 |
| Melting Point (DSC) °C. | 113 | 112 | 108 |
| Bonding Temperature °C. | 120 | 120 | 120 |
| Type Failure | None | None | None |
| Grindability | Excellent | Excellent | Excellent |
| Crystallization ½ time (min.) | 0.3 | 1.7 | 3.0 |
| Coating wt. - g./yd.² | 18 | 18 | 18 |

| Example No. | 4 | 5 | 6 |
|---|---|---|---|
| Molar Percentages of Acid and Glycol Components | 55 Dimethyl Terephthalate 45 Dimethyl Glutarate 70 1,4-Butanediol 30 Diethylene Glycol | 60 Dimethyl Terephthalate 40 Dimethyl Glutarate 63 1,4-Butanediol 37 Diethylene Glycol | 65 Dimethyl Terephthalate 35 Dimethyl Glutarate 65 1,4-Butanediol 35 Diethylene Glycol |
| Inherent viscosity | 1.1 | 1.0 | 1.15 |
| $\Delta H_f$ Cal./g (DSC) | 2.3 | 2.23 | 2.73 |
| T-Peel Strength 23° C. lb./in. | 2.1 | 1.9 | 1.7 |
| T-Peel Strength After Dry-Cleaning (Commercial) lb./in. | 2.0 | 1.7 | 1.5 |
| Melting Point (DSC) °C. | 102 | 100 | 110 |
| Bonding Temperature °C. | 120 | 120 | 120 |
| Type Failure | None | None | None |
| Grindability | Excellent | Excellent | Excellent |
| Crystallization ½ time (min.) | 0.7 | 2.1 | 1.9 |

| Example No. | 7 | 8 | 9 (Control) |
|---|---|---|---|
| Molar Percentages of Acid and Glycol Components | 60 Dimethyl Terephthalate 40 Dimethyl Adipate 75 1,4-Butanediol 25 Diethylene Glycol | 65 Dimethyl Terephthalate 35 Dimethyl Succinate 70 1,4-Butanediol 30 Diethylene Glycol | 70 Dimethyl Terephthalate 30 Dimethyl Isophthalate 55 1,4-Butanediol 45 Diethylene Glycol |
| Inherent viscosity | 0.95 | 0.85 | 0.98 |
| $\Delta H_f$ Cal./g (DSC) | 2.85 | 3.2 | 2.8 |
| T-Peel Strength 23° C. lb./in. | 2.1 | 1.9 | 0.85 |
| T-Peel Strength After Dry-Cleaning (Commercial) lb./in. | 1.9 | 1.7 | 2.1 |

TABLE 1-continued

Properties of Copolyester Adhesives

| | | | |
|---|---|---|---|
| Melting Point (DSC) °C. | 112 | 114 | |
| Bonding Temperature °C. | 120 | 120 | 120 |
| Type Failure | None | None | Tacky, Dry Clean Failure |
| Grindability | Excellent | Excellent | Poor |
| Crystallization ½ time (min.) | 1.5 | 0.6 | >15 |
| Coating weight g./yd.$^2$ | 19 | 21 | 18 |

| Example No. | 10 (Control) | 11 (Control) | 12 (Control) |
|---|---|---|---|
| Molar Percentages of Acid and Glycol Components | 55 Dimethyl Terephthalate 45 Dimethyl Glutarate 70 1,4-Butanediol 30 Ethylene Glycol | 100 Trans 1,4-Cyclohexane Dicarboxylate 45 1,4-Butanediol 55 Diethylene Glycol | 50 Terephthalic 20 Isophthalic 30 Azealic Acid 100 1,4-Butanediol |
| Inherent viscosity | 0.95 | 0.82 | 0.84 |
| ΔH$_f$ Cal./g (DSC) | 2.1 | <1 | 1.45 |
| T-Peel Strength 23° C. lb./in. | 2.1 | 2.4 | 2.0 |
| T-Peel Strength After Dry-Cleaning (Commercial) lb./in. | 0.8 | 0.1 | 0.3 |
| Melting Point (DSC) °C. | 108 | .91 | 115 |
| Bonding Temperature °C. | — | 110 | 110 |
| Type Failure | Tacky | Tacky, Dry Clean Failure | Tacky, Dry Clean Failure |
| Grindability | Poor | Poor | Poor |
| Crystallization ½ time (min.) | >12 | >15 min | >15 |
| Coating weight g./yd.$^2$ | — | 21 | 19 |

Another copolyester prepared in accordance with this invention is as follows. Ninety seven grams of dimethyl terephthalate (0.5 mole), 60 grams (0.566 mole) of diethylene glycol, 38.7 grams (0.43 mole) of 1,4-butanediol, and 1.2 mL of n-butanol solution of titanium tetraisopropoxide which is 0.96 wt. % titanium are weighed into 500 mL, single-neck, round-bottom flask equipped with a nitrogen inlet, stirred, vacuum outlet, and a condensing flask. The flask is heated at 200° C. in a Belmont metal bath for three hours with a nitrogen sweep over the reaction mixture. When the theoretical amount of methanol has distilled from the reaction mixture, the metal bath temperature is increased to 255° C. and the pressure in the flask is reduced to 0.5 to 0.2 mm of mercury for one hour. The flask is then removed from the bath and allowed to cool as the polyester crystallizes. Gas chromatographic analysis of the copolyester shows the copolyester contains the following mole percents of reaction residues: dimethyl terephthalate 100 mole %, diethylene glycol 45 mole %, and 1,4-butanediol 55 mole %.

The copolyester has an inherent viscosity of 0.95 and a crystalline melting point of 155° C. (DSC). The crystallization half time of this copolyester is 1 minute.

A typical spinning of the binder fibers described consists of extruding the polymer through a multi hole spinnerette between 225°–260° C., drawing the fiber through a steam chest at approximately 140° C., crimping and cutting the fiber into shorth lengths. Typical fiber properties are: Denier per filament 2.25, tenacity 2.0 grams/denier, elongation 25%, crimp 10 per inch at 95±15 degree crimp angle, staple length 1.5 inches.

Other crimp angles and staple lengths can be used depending upon the matrix fiber to which the binder fiber would be blended.

The binder fibers are then carded to obtain an ultimate blend with a matrix fiber, typically a polyester fiber, in the amounts necessary to obtain good bonding, depending upon the item to be constructed. The nonwoven is then heated at the appropriate temperature to obtain bonding. Usually not more than 25 wt. % of the binder fiber is required to bond the most critical item. A more typical loading is 10 to 15 wt. % of binder fiber and 80–90 wt. % of the matrix fiber. These binder fibers can be used to bond matrix fibers of polyamide, polyester, polyolefin, and natural fibers.

Table II shows examples of the thermographic properties of binder fibers which can be designed to melt over a wide range of temperatures, which have rapid crystallization rates, which will permit nonwoven fabrics to be prepared and which do not have tacky surfaces. Table III shows examples of nonwoven webs prepared using binder fibers of varying compositions which can be bonded over a wide range of temperatures and produce strong nonwoven fabrics as shown by the tensile properties. Tensile properties can be varied depending on the weight (light or heavy) of nonwoven articles to be made, bonding temperatures and pressures, and the amount of binder included in the nonwoven.

TABLE II

Thermographic Analysis of Copolyester Binder Fiber Compositions

| Polymer | Derived From | Differential Melting Point °C. | Scanning Calorimeter Crystallization Half-Time Min. | Analysis Apparent Heat of Fusion (ΔH$_f$) |
|---|---|---|---|---|
| A | 100 mole % terephthalic acid 50 mole % 1,4-butanediol 50 mole % diethylene glycol | 154 | 0.5 | 5.81 |
| B | 100 mole % terephthalic acid 40 mole % diethylene glycol 60 mole % 1,4-butanediol | 166 | 0.3 | 6.2 |
| C | 55 mole % terephthalic acid 45 mole % glutaric acid 30 mole % diethylene glycol 70 mole % 1,4-butanediol | 114 | 3 | 3.9 |
| D | 50 mole % terephthalic acid 50 mole % glutaric acid 100 mole % 1,4-butanediol | 132 | 2 | 3.25 |
| E | 65 mole % terephthalic acid | 122 | 1.5 | 3.9 |

TABLE II-continued
Thermographic Analysis of Copolyester Binder Fiber Compositions

| Polymer | Derived From | Differential Melting Point °C. | Scanning Calorimeter Crystallization Half-Time Min. | Analysis Apparent Heat of Fusion (ΔH_f) |
|---|---|---|---|---|
| | 35 mole % glutaric acid<br>35 mole % diethylene glycol<br>65 mole % 1,4-butanediol | | | |

TABLE III
Examples of Nonwoven Fabrics, Bonded With Binder Fibers and Tensile Properties of the Bonded Fabrics

| Non Woven* | Extrusion Temp. °C. | Bonding Temp. °C. | Fabric Weight oz/yd² | Fabric Thickness inches | Flexural Rigidity 9/Cu² Machine Dir. | Flexural Rigidity 9/Cu² Cross Machine | Breaking Load × 10³ grams Machine Dir. | Breaking Load × 10³ grams Cross Machine Dir. |
|---|---|---|---|---|---|---|---|---|
| F | 225 | 175 | 6.5 | 0.025 | 138 | 99 | 41 | 13 |
| G | 225 | 190 | 5.0 | 0.052 | 41 | 23 | 29 | 10 |
| H | 200 | 150 | 6.4 | 0.019 | 74 | 32 | 36 | 10 |
| I | 230 | 150 | 6.2 | 0.019 | 43 | 27 | 29 | 9 |
| J | 200 | 135 | 4.8 | 0.026 | 16 | 3 | 15 | 2 |

*F - Non-woven consist of 20 wt. % Polymer A (See Table II) % poly(ethylene terephthalate)
G - Non-woven consist of 20 wt. % Polymer B (See Table II) % poly(ethylene terephthalate)
H - Non-woven consist of 20 wt. % Polymer C (See Table II) and 80 wt. % of poly(ethylene terephthalate)
I - Non-woven consist of 20 wt. % Polymer D (See Table II) poly(ethylene terephthalate)
J - Non-woven consist of 20 wt. % Polymer E (See Table II) and 80 wt. % of poly(ethylene terephthalate)
All Binder Fibers are 1¼ in. Staple Length Unless otherwise specified, all parts, percentages, ratios, etc., are by weight.

The invention has been described in detail with particular reference to preferred embodiments thereof, but it will be understood that variations and modifications can be effected within the spirit and scope of the invention.

What is claimed is:

1. A linear copolyester derived from 100 mole % of a dibasic acid component comprising about 40–100 mole % terephthalic acid and 100 mole % of a glycol component comprising about 40–100 mole % 1,4-butanediol, wherein about 20–120 mole %, based on a total of 200 mole % polymer, is derived from about
   (a) 0–60 mole % of a second acid selected from the group consisting of aliphatic dicarboxylic acids having 3–12 carbon atoms,
   (b) 0–60 mole % of diethylene glycol, or
   (c) 20–120 mole % of a combination of said second acid and diethylene glycol,
said copolyester characterized by having a melting point of about 40°–190° C., a glass transition temperature of about −20° C. to about 40° C., a heat of fusion of not less than 1.0 calorie per gram, and a crystallization half time of less than 10 minutes at maximum crystallization temperature.

2. A copolyester according to claim 1 derived from an acid component of terephthalic acid and a second acid selected from the group consisting of aliphatic dicarboxylic acids having 3–12 carbon atoms.

3. A copolyester according to claim 1 derived from a glycol component of 1,4-butanediol and diethylene glycol.

4. A copolyester according to claim 1 wherein said acid component comprises terephthalic acid and at least one other aliphatic dicarboxylic acid having 3–12 carbon atoms, and said glycol component comprises 1,4-butanediol and diethylene glycol.

5. A linear copolyester derived from 100 mole % of a dibasic acid component comprising about 50–100 mole % terephthalic acid and 100 mole % of a glycol component comprising about 50–100 mole % 1,4-butanediol, wherein about 60–120 mole % based on a total of 200 mole % polymer is derived from about
   (a) 0–60 mole % of a second acid selected from the group consisting of succinic acid, adipic acid, and glutaric acid,
   (b) 0–60 mole % diethylene glycol, or
   (c) 60–120 mole % of a combination of said second acid and diethylene glycol,
said copolyester characterized by having a melting point of about 40°–130° C., a glass transition temperature of about −20° C. to about 40° C., a heat of fusion of not less than 1.0 calorie per gram, and a crystallization half time of less than 10 minutes at maximum crystallization temperature.

6. A copolyester according to claim 5 derived from an acid component of terephthalic acid and a second acid selected from succinic, adipic and glutaric acid.

7. A copolyester according to claim 5 derived from a glycol component of 1,4-butanediol and diethylene glycol.

8. A copolyester according to claim 5 wherein said acid component comprises terephthalic acid and a second acid selected from the group consisting of succinic, glutaric and adipic, and said glycol component comprises 1,4-butanediol and diethylene glycol.

9. A linear copolyester derived from 100 mole % of a dibasic acid component comprising about 40–100 mole % terephthalic acid and 100 mole % of a glycol component comprising about 40–100 mole % 1,4-butanediol, wherein about 20–70 mole % based on a total of 200 mole % polymer is derived from about
   (a) 0–60 mole % of a second acid selected from the group consisting of aliphatic dicarboxylic acids having 3–12 carbon atoms,
   (b) 0–60 mole % of diethylene glycol, or
   (c) 20–70 mole % of a combination of said second acid and diethylene glycol, said copolyester characterized by having a melting point of about 125°-190° C., a glass transition temperature of about −20° C. to about 40° C., a heat of fusion of not less than 1.0 calorie per gram, and a crystallization half time of less than 10 minutes at maximum crystallization temperature.

10. A copolyester according to claim 9 derived from an acid component of terephthalic acid and a second acid selected from the group consisting of aliphatic dicarboxylic acids having 3-12 carbon atoms.

11. A copolyester according to claim 9 derived from a glycol component of 1,4-butanediol and diethylene glycol.

12. A copolyester according to claim 9 wherein said acid component comprises terephthalic acid and at least one other dicarboxylic acid having 3-12 carbon atoms, and said glycol component comprises 1,4-butanediol and diethylene glycol.

13. Fabric material adhesively connected by the composition of claim 5.

14. A fusible interlining having the composition of claim 5 coated thereon.

15. A binder fiber comprising the copolyester of claim 9.

* * * * *